(12) United States Patent
Tanaka

(10) Patent No.: US 12,104,524 B2
(45) Date of Patent: Oct. 1, 2024

(54) TWO-CYLINDER RECIPROCATING ENGINE

(71) Applicant: Kubota Corporation, Osaka (JP)

(72) Inventor: Kazuhiro Tanaka, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/826,802

(22) Filed: May 27, 2022

(65) Prior Publication Data

US 2023/0096904 A1     Mar. 30, 2023

(30) Foreign Application Priority Data

Sep. 30, 2021    (JP) .................................. 2021-161690

(51) Int. Cl.
| | |
|---|---|
| *F02M 26/12* | (2016.01) |
| *F02B 75/06* | (2006.01) |
| *F02B 75/20* | (2006.01) |
| *F02B 75/22* | (2006.01) |
| *F02B 75/02* | (2006.01) |
| *F02B 75/18* | (2006.01) |

(52) U.S. Cl.
CPC ............ *F02B 75/065* (2013.01); *F02B 75/20* (2013.01); *F02B 75/22* (2013.01); *F02B 2075/027* (2013.01); *F02B 2075/1808* (2013.01)

(58) Field of Classification Search
CPC ................ F02B 2075/027; F02B 75/20; F02B 2075/1808; F02B 75/16; F01B 1/02
See application file for complete search history.

(56) References Cited

U.S. PATENT DOCUMENTS

| | | | | |
|---|---|---|---|---|
| 4,192,846 | A * | 3/1980 | Oya ........................ | F01N 3/26 60/293 |
| 7,241,426 | B2 * | 7/2007 | Hardesty ............. | F01N 13/0097 422/177 |
| 2005/0042151 | A1 * | 2/2005 | Alward ................ | D04H 1/4209 422/177 |
| 2012/0138008 | A1 * | 6/2012 | Hayman .............. | F02M 35/116 123/193.5 |

(Continued)

FOREIGN PATENT DOCUMENTS

| | | | | |
|---|---|---|---|---|
| CN | 1912371 A | * | 2/2007 | |
| CN | 203856570 U | * | 10/2014 | ............ F02B 37/183 |

(Continued)

OTHER PUBLICATIONS

DE 102016012408 B4 English Translation (Year: 2021).*

*Primary Examiner* — George C Jin
*Assistant Examiner* — Teuta B Holbrook
(74) *Attorney, Agent, or Firm* — The Webb Law Firm

(57) ABSTRACT

A two-cylinder reciprocating engine includes a cylinder block; a first cylinder with a combustion chamber; a second cylinder with a combustion chamber; a crankshaft coupled to the first cylinder and the second cylinder with a crank angle of 270 degrees; a first exhaust port connected with the combustion chamber of the first cylinder; a second exhaust port connected with the combustion chamber of the second cylinder; a first header connected with the first exhaust port; a second header connected with the second exhaust port; and an exhaust converging section connected with the first header and the second header, wherein the first header, the second header, and the exhaust converging section are in the cylinder block.

4 Claims, 4 Drawing Sheets

(56) References Cited

U.S. PATENT DOCUMENTS

| | | | |
|---|---|---|---|
| 2013/0098000 A1* | 4/2013 | Ruhland | F02D 13/02 60/273 |
| 2013/0142703 A1* | 6/2013 | Westerbeke, Jr. | F01N 3/046 422/173 |
| 2014/0165556 A1* | 6/2014 | Plagens | F02F 1/243 60/602 |
| 2014/0238367 A1* | 8/2014 | Nakashima | F02B 23/08 123/657 |
| 2017/0218880 A1* | 8/2017 | Hemink | F01N 13/105 |
| 2018/0135499 A1* | 5/2018 | Kim | F01N 13/1888 |
| 2019/0264595 A1* | 8/2019 | Pekrul | F01N 13/08 |

FOREIGN PATENT DOCUMENTS

| | | | | |
|---|---|---|---|---|
| DE | 102016012408 B4 * | 1/2021 | | F01M 11/02 |
| JP | 54079317 A * | 6/1979 | | |
| JP | 62197628 A * | 9/1987 | | |
| JP | 2007309251 A * | 11/2007 | | |
| JP | 2015034532 A * | 2/2015 | | |
| JP | 202142678 A | 3/2021 | | |
| KR | 20090028817 A * | 3/2009 | | |

* cited by examiner

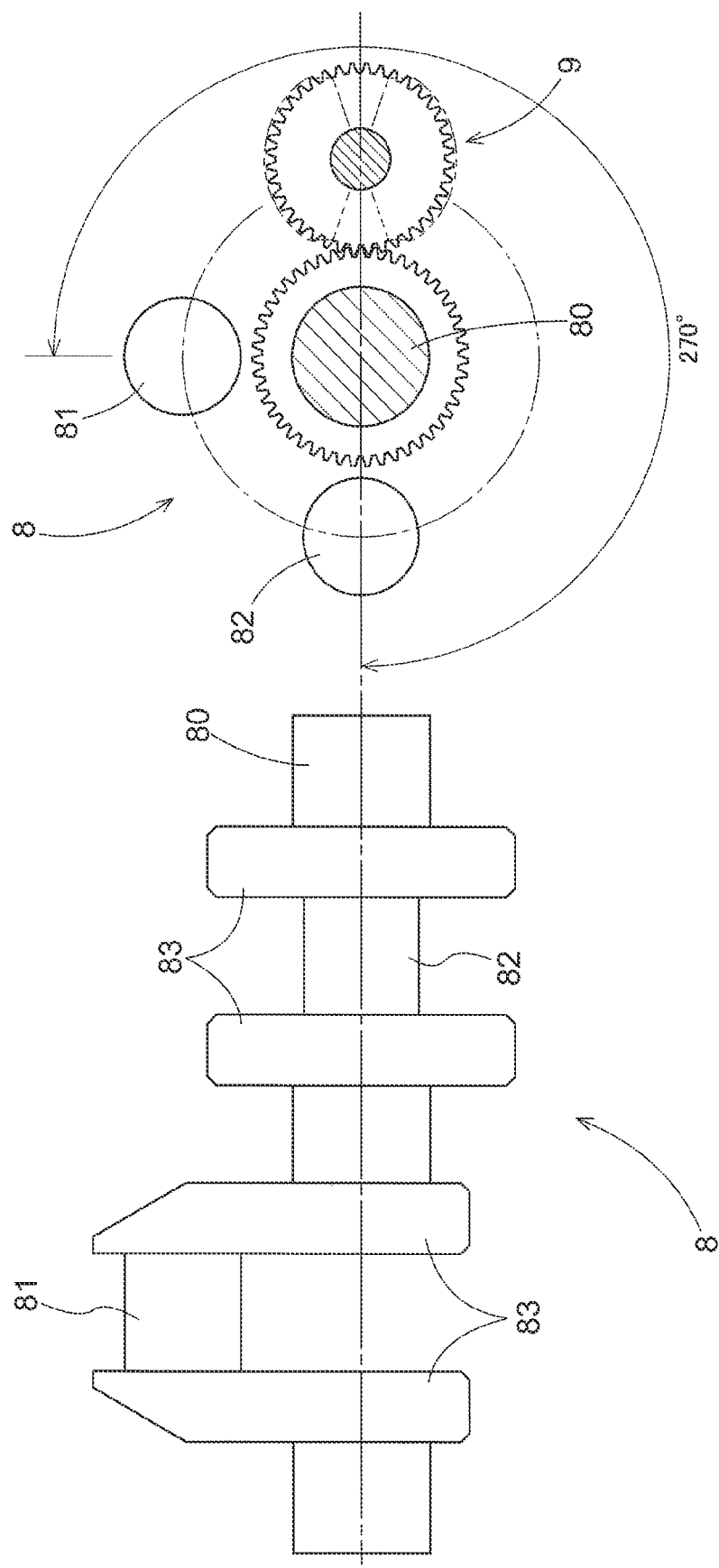

TWO-CYLINDER RECIPROCATING ENGINE

CROSS REFERENCE TO RELATED APPLICATION

This application claims priority to Japanese Patent Application No. 2021-161690 filed Sep. 30, 2021, the disclosure of which is hereby incorporated by reference in its entirety.

BACKGROUND OF THE INVENTION

Field of the Invention

The present invention relates to a two-cylinder reciprocating engine, in particular the exhaust system of a two-cylinder reciprocating engine.

Description of Related Art

A two-cylinder reciprocating engine may have a crank angle of 180 degrees between its first and second cylinders and include a balancer to cancel engine vibration and have an improved output performance at the same time. Japanese Unexamined Patent Application Publication, Tokukai, No. 2021-042678 (Patent Literature 1) discloses a two-cylinder reciprocating engine including in a cylinder block a first cylinder with an exhaust pipe and a second cylinder with an exhaust pipe. The two exhaust pipes extend out of the cylinder block and downward near the front face of the cylinder block, and are connected with a converging pipe near the bottom of the cylinder block. The converging pipe has a downstream end connected with the upstream end of a catalytic pipe. This configuration allows the exhaust pipes to be sufficiently long to reach the converging pipe or catalytic pipe, thereby reducing exhaust interference.

PATENT LITERATURE 1

Japanese Unexamined Patent Application Publication, Tokukai, No. 2021-042678

SUMMARY OF THE INVENTION

A two-cylinder reciprocating engine may be mounted in a vehicle such as a utility vehicle that frequently performs tough travel such as off-road travel. In such a case, long exhaust pipes unfortunately lead to the engine occupying a large space or to a temperature rise near the exhaust pipes due to the large surface areas of the long exhaust pipes.

In view of the above circumstances, the present invention has an object of providing a two-cylinder reciprocating engine that occupies a small space and that only causes a minimal temperature rise nearby.

SOLUTION TO PROBLEM

A two-cylinder reciprocating engine according to the present invention includes: a cylinder block; a first cylinder; a second cylinder; a crankshaft coupled to the first and second cylinders with a crank angle of 270 degrees; a first exhaust port provided for the cylinder block and connected with the combustion chamber of the first cylinder; a second exhaust port provided for the cylinder block and connected with the combustion chamber of the second cylinder; a first header connected with the first exhaust port; a second header connected with the second exhaust port; and an exhaust converging section connected with the first and second headers and configured to converge respective exhaust gases from the first and second exhaust ports, the first and second headers and the exhaust converging section being in the cylinder block.

The above configuration involves a so-called 270-degree crank, with the first and second cylinders connected with a crank angle of 270 degrees, thereby reducing exhaust interference as compared to a 180-degree crank. This is utilized to provide in the cylinder block an exhaust gas flow path made up of a first exhaust port, a first header, a second exhaust port, a second header, and an exhaust converging section. The above configuration, in other words, has a short exhaust gas flow path that extends from the combustion chamber of each of the first and second cylinders to the exhaust converging section and that is in the cylinder block. This allows the exhaust gas flow path to have a small surface area, and reduces heat damage as well. The above configuration also allows the engine structure, including the exhaust gas flow path, to be simple, thereby reducing the space occupied by the engine. This allows the engine to be disposed at a high position from the ground without excessively narrowing the space for other vehicle equipment. This is advantageous to, for example, a utility vehicle designed to perform off-road travel.

The above configuration, which involves a 270-degree crank, reduces exhaust interference as compared to a 180-degree crank, but does cause first-order vibration. To reduce the vibration, a preferred embodiment of the present invention includes a uniaxial primary balancer extending in parallel to the crankshaft.

A straight-twin reciprocating engine is advantageous over a V-twin reciprocating engine in that the structure is simple, that the degree of freedom is high of the layout of the vehicle body in which to mount the engine, and that the cost is low. A preferred embodiment of the present invention is thus arranged such that the first and second cylinders are arranged in a line.

A preferred embodiment of the present invention includes a catalytic pipe adjacent to the cylinder block, connected with a discharge opening of the exhaust converging section, and containing a catalytic converter configured to clean exhaust gas. This configuration involves a catalytic pipe adjacent to the cylinder block. This allows the catalytic converter to be heated quickly, with the result of an improved exhaust gas cleaning function.

BRIEF DESCRIPTION OF THE INVENTION

FIG. 4 is a diagram schematically illustrating a crankshaft of an engine.

DESCRIPTION OF THE INVENTION

Unless otherwise stated, the present specification is written as follows: Terms such as "forward" mean the forward direction for forward travel in relation to the front-back direction of the vehicle body (travel direction). Terms such as "backward" mean the backward direction for forward travel in relation to the front-back direction of the body (travel direction). The terms "left-right direction" and "lateral direction" mean the transverse direction (width direction) of the body, which is orthogonal to the front-back direction of the body, where the word "left" means the left side relative to forward travel, and the word "right" means the right side relative to forward travel. Terms such as "upward" and "downward" refer to a position in the vertical direction of the body, that is, a height from the ground. The terms "upstream" and "downstream" refer to the direction in which exhaust gas flows.

Figure 1:
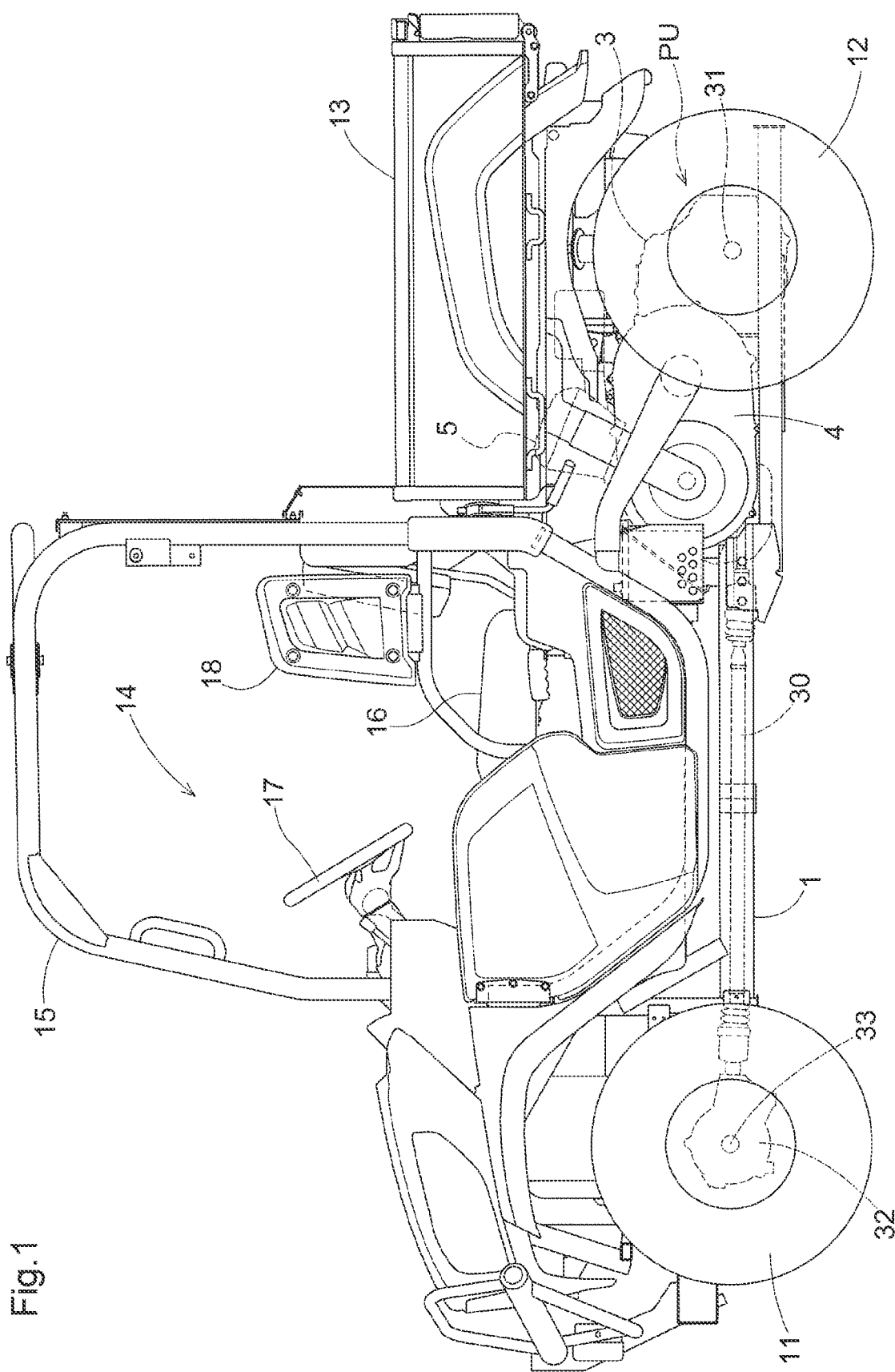
FIG. 1 is a side view of an off-road vehicle.
Figure 2:
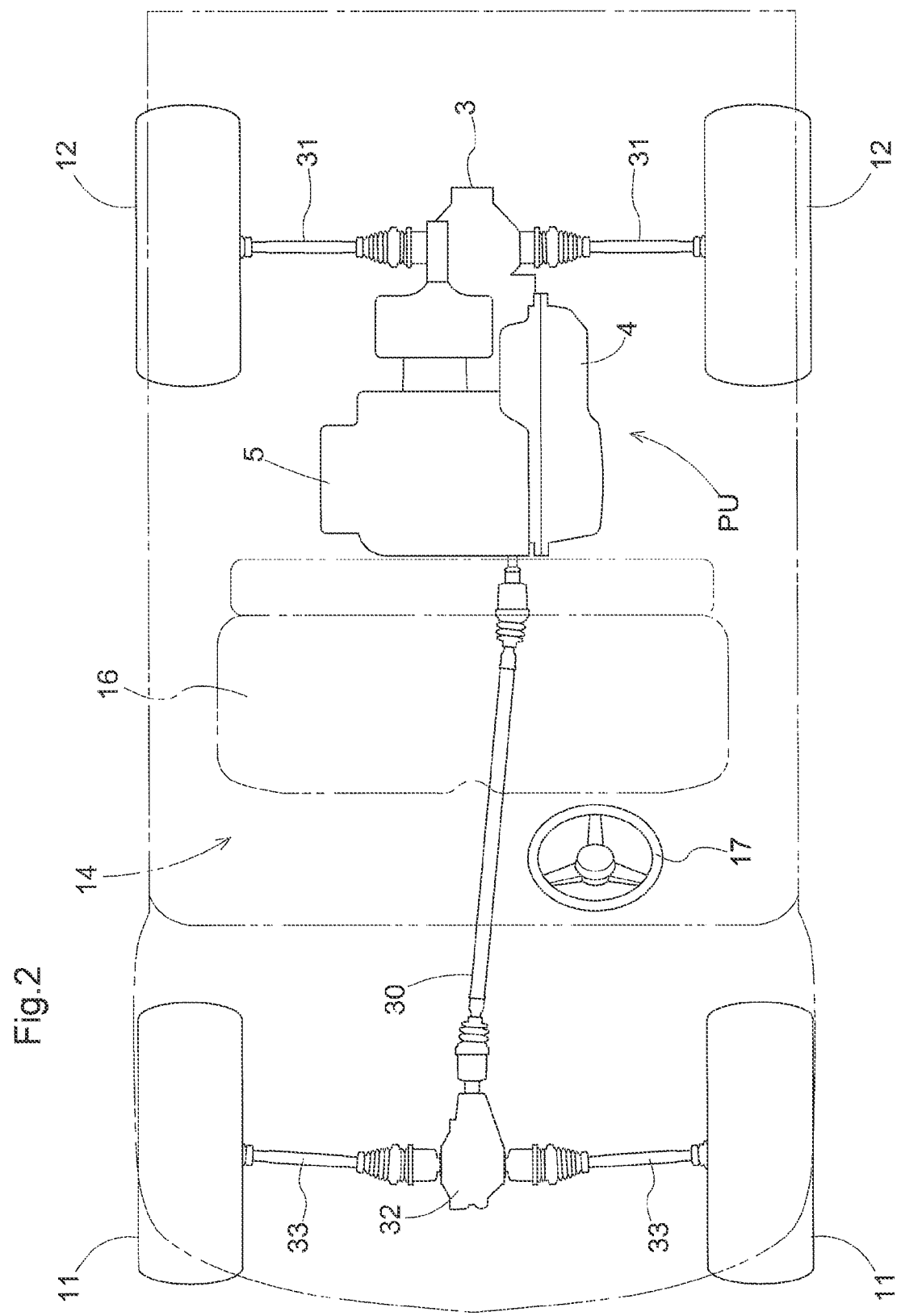
FIG. 2 is a diagram illustrating the power transmission system of an off-road vehicle as viewed from above.

The description below deals with a two-cylinder reciprocating engine as a specific embodiment of the present invention with reference to drawings. FIG. 1 is a side view of an off-road vehicle as an example utility vehicle including a two-cylinder reciprocating engine (hereinafter referred to simply as "engine"). FIG. 2 is a diagram illustrating the power transmission system of an off-road vehicle as viewed from above.

The off-road vehicle includes a body frame 1, a pair of left and right front wheels 11, and a pair of left and right rear wheels 12. The front wheels 11 and the rear wheels 12 are capable of being turned, and are designed to be on the ground to support the body frame 1. The off-road vehicle also includes a driver section 14 at a central portion of the body frame 1, a carrier box 13 at a back portion of the body frame 1, and a power unit PU backward of the driver section 14 and under the carrier box 13. The off-road vehicle is of a four-wheel drive, that is, configured to transmit a driving force from the power unit PU to the front wheels 11 and the rear wheels 12. The off-road vehicle is capable of various types of travel including off-road travel.

The off-road vehicle includes a protection frame 15 enclosing and protecting the driver section 14. The carrier box 13 is of a dump type; its front end is capable of being lifted for unloading. The driver section 14 includes a driver's seat 16 for a driver to sit on, a steering wheel 17 for use to turn the front wheels 11, and two exterior side panels 18 to the respective opposite lateral sides of the driver's seat 16.

As illustrated in FIG. 2, the power unit PU includes an engine 5, a continuously variable transmission 4 (hereinafter referred to as "CVT 4"), and a transmission 3. The transmission 3 is configured to further vary motive power outputted by the engine 5 and varied by the CVT 4 and transmit the resulting motive power to the rear wheels 12. The power transmission system includes a pair of left and right rear axles 31 extending from a lower end portion of the transmission 3 to the rear wheels 12 and configured to transmit varied motive power from the transmission 3 to the rear wheels 12. The power transmission system includes a power transmission shaft 30 extending forward from a lower end portion of the transmission 3. The power transmission system also includes a front-wheel differential mechanism 32 and a pair of left and right front axles 33 via which the power transmission shaft 30 transmits its motive power to the front wheels 11.

Figure 3:
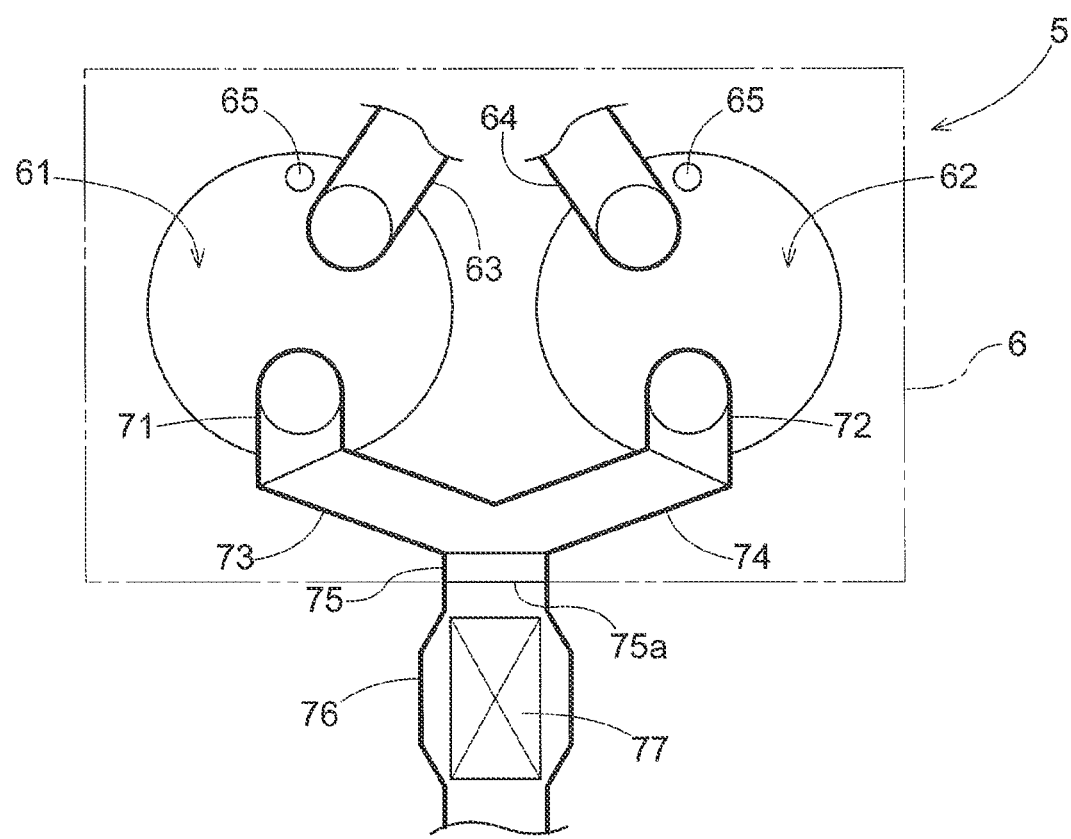
FIG. 3 is a diagram schematically illustrating an engine.

The description below deals with the structure of the engine 5, in particular the exhaust system, with reference to the schematic diagram of FIG. 3. The engine 5 includes a cylinder block body as a main component. Technically, the cylinder block body is provided with cylinder heads assembled to an upper portion thereof. The present specification uses the term "cylinder block 6" to refer to a combination of the cylinder block body and cylinder heads.

The cylinder block 6 includes a first cylinder 61 and a second cylinder 62 arranged in a line, meaning that the engine 5 is a four-stroke straight-twin engine. The first and second cylinders 61 and 62 each include a combustion chamber provided with a spark plug 65. The first cylinder 61 includes (i) a first intake port 63 at an upper portion of its combustion chamber on a first side and (ii) a first exhaust port 71 at an upper portion of its combustion chamber on a second side. The second cylinder 62 includes (i) a second intake port 64 at an upper portion of its combustion chamber on the first side and (ii) a second exhaust port 72 at an upper portion of its combustion chamber on the second side. The first and second intake ports 63 and 64 are each provided with an intake valve (not illustrated in the drawings). The first and second exhaust ports 71 and 72 are each provided with an exhaust valve (not illustrated in the drawings).

The cylinder block 6 includes a first header 73 connected with the downstream end of the first exhaust port 71 and a second header 74 connected with the downstream end of the second exhaust port 72. The cylinder block 6 also includes an exhaust converging section 75 having an upstream end connected with the first and second headers 73 and 74. The exhaust converging section 75 functions to converge respective exhaust gases from the first and second exhaust ports 71 and 72. The first and second headers 73 and 74 and the exhaust converging section 75 are integral with one another in the form of an exhaust manifold in the cylinder block 6.

The exhaust converging section 75 has at its downstream end a discharge opening 75a connected with a catalytic pipe 76 extending from and adjacent to the cylinder block 6. The catalytic pipe 76 contains a catalytic converter 77 configured to clean exhaust gas. The catalytic converter 77, which is adjacent to the cylinder block 6, receives sufficient heat from the cylinder block 6 to be heated quickly, with the result of an improved exhaust gas cleaning function.

FIG. 4 schematically illustrates a crankshaft 8. The crankshaft 8 includes a main journal 80, a counterweight 83, a first crankpin 81, and a second crankpin 82. The four-stroke straight-twin engine has a crank angle of 270 degrees: It has a 270-degree phase difference between the first crankpin 81, which is coupled to the piston rod (not illustrated in the drawings) of the first cylinder 61, and the second crankpin 82, which is coupled to the piston rod (not illustrated in the drawings) of the second cylinder 62. The engine 5 is thus controlled by a control system such that valve timing, fuel injection, and ignition have respective phases in accordance with the 270-degree crank.

A 270-degree crank has a long interval between ignitions and low exhaust interference as compared to a 180-degree crank. Further, a 270-degree crank advantageously causes no second-order vibration unlike a 180-degree crank or 360-degree crank. A 270-degree crank, on the other hand, does cause first-order vibration.

The engine 5 thus includes a uniaxial primary balancer 9 to cancel the first-order vibration. As schematically illustrated in FIG. 4, the uniaxial primary balancer 9 extends in parallel to the crankshaft 8. The uniaxial primary balancer 9 includes a shaft coupled to the crankshaft 8 in an interlocking manner for rotation and a balancer attached to the shaft.

Alternative Embodiments (1) The two-cylinder reciprocating engine as an embodiment of the present invention is described above only in a simplified manner, and may have any structure within the scope of the present invention.

(2) The two-cylinder reciprocating engine described above as an embodiment of the present invention is mounted in a four-wheel drive utility vehicle, but may instead be mounted in any of various other vehicles such as a two-wheel drive vehicle, a two-wheeled vehicle, and a three-wheeled vehicle. The two-cylinder reciprocating engine may further be used as a stationary engine or a portable engine.

The arrangements disclosed for the above embodiments (including the alternative embodiments; hereinafter the same applies) may each be combined with an arrangement disclosed for another embodiment, as long as such a combination does not cause a contradiction. Further, the embodiments disclosed in the present specification are mere examples. The present invention is not limited to those embodiments, and may be altered as appropriate, as long as such an alteration does not result in a failure to attain an object of the present invention.

INDUSTRIAL APPLICABILITY

The present invention is applicable to various two-cylinder reciprocating engines.

REFERENCE SIGNS LIST

5 Engine (two-cylinder reciprocating engine)
6 Cylinder block
61 First cylinder
62 Second cylinder
71 First exhaust port
72 Second exhaust port
73 First header
74 Second header
75 Exhaust converging section
75a Discharge opening
76 Catalytic pipe
77 Catalytic converter
8 Crankshaft
80 Main journal
81 First crankpin
82 Second crankpin
9 Uniaxial primary balancer
PU Power unit

The invention claimed is:

1. A two-cylinder reciprocating engine, comprising:
a cylinder block;
a first cylinder comprising a combustion chamber;
a second cylinder comprising a combustion chamber;
a crankshaft coupled to the first and second cylinders with a crank angle of 270 degrees, the crankshaft including a main journal, a counterweight, a first crankpin, and a second crankpin;
a uniaxial primary balancer extending in parallel to the crankshaft and including a single balancer shaft coupled to the crankshaft in an interlocking manner for rotation, and a balancer attached to the single balancer shaft;
a first exhaust port provided for the cylinder block with a first exhaust valve and connected with the combustion chamber of the first cylinder;
a second exhaust port provided for the cylinder block with a second exhaust valve and connected with the combustion chamber of the second cylinder;
a control system configured to control timing of the first and second exhaust valves, timing of fuel injection into the combustion chambers of the first and second cylinders, and timing of ignition at one or more intervals and at respective phases corresponding to the crankshaft having the crank angle of 270 degrees;
a first header connected with the first exhaust port;
a second header connected with the second exhaust port; and
an exhaust converging section connected with the first and second headers and configured to converge respective exhaust gases from the first and second exhaust ports, wherein the first header, the second header and the exhaust converging section are integral with one another in a form of an exhaust manifold;
wherein the exhaust manifold is in the cylinder block;
wherein the exhaust converging section discharges converged exhaust gases outside the cylinder block via a discharge opening of the exhaust converging section; and
wherein a catalytic pipe, adjacent to the cylinder block outside the cylinder block, directly connected with the discharge opening, downstream of the exhaust converging section, and containing a catalytic converter configured to clean exhaust gas.

2. The two-cylinder reciprocating engine according to claim 1, wherein the first and second cylinders are arranged in a line.

3. The two-cylinder reciprocating engine according to claim 1, wherein the two-cylinder reciprocating engine is mounted in a utility vehicle.

4. The two-cylinder reciprocating engine according to claim 1, wherein the two-cylinder reciprocating engine is a stationary engine or a portable engine.

* * * * *